United States Patent [19]

Shultz

[11] 3,946,987

[45] Mar. 30, 1976

[54] COIL SPRING SPREADER

[76] Inventor: William E. Shultz, 239 N. Main St., Lombard, Ill. 60148

[22] Filed: Mar. 17, 1975

[21] Appl. No.: 558,736

[52] U.S. Cl. .................................. 254/10.5; 29/227
[51] Int. Cl.² .......................................... B60P 1/48
[58] Field of Search ............ 254/10.5; 29/217, 218, 29/227, 256, 239; 269/221

[56] References Cited
UNITED STATES PATENTS

| | | | |
|---|---|---|---|
| 1,051,633 | 11/1913 | Price | 29/218 |
| 1,398,269 | 11/1921 | Nelson | 29/218 |
| 1,467,439 | 9/1923 | Lindenmuth | 29/218 |
| 1,501,417 | 7/1924 | Manna | 29/218 |
| 1,716,718 | 6/1929 | Castagno | 269/221 |

Primary Examiner—Al Lawrence Smith
Assistant Examiner—Robert C. Watson
Attorney, Agent, or Firm—Mason, Kolehmainen, Rathburn & Wyss

[57] ABSTRACT

A spring spreader includes two elongated legs each having a coil-contacting end and a pivot end, said elongated legs being interconnected near the pivot end by an elongated pivotal axis of interconnection. A fulcrum is disposed between the elongated legs and is removable from at least one of the legs. The fulcrum contacts each elongated leg near the coil contacting end of each leg. Each leg is pivotable in three directions for easy and individual insertion of each leg between adjacent coils of a spring.

19 Claims, 7 Drawing Figures

U.S. Patent   March 30, 1976   3,946,987
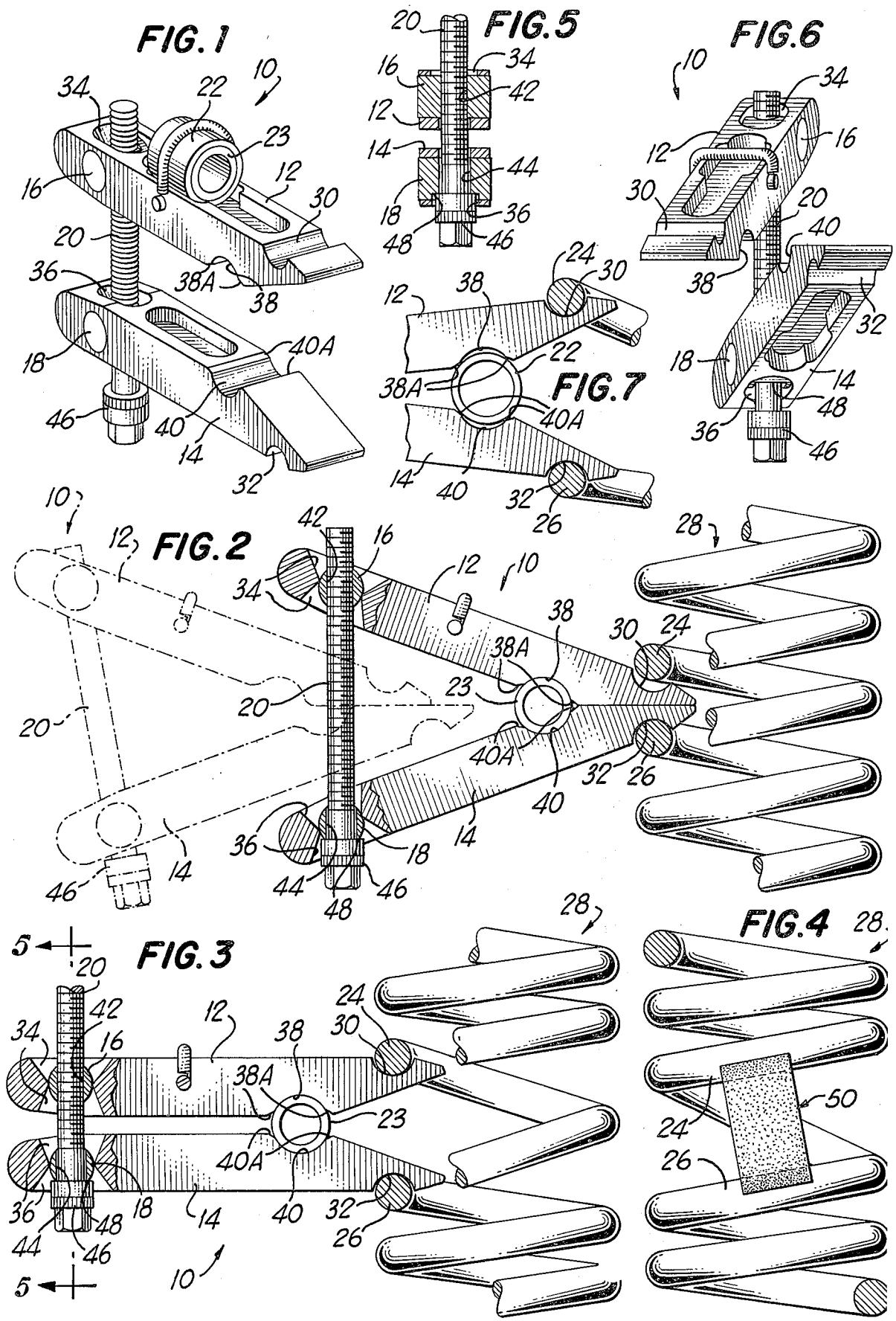

COIL SPRING SPREADER

This invention relates to a device for separating adjacent coils of a coil spring and more particularly, to a coil spring spreader for the insertion of a spacing member between the separated coils. More specifically, the spring spreader of this invention can be used for raising a vehicle body and for providing firmer vehicle suspension by separating adjacent vehicle springs so that a spacing means can be easily positioned between the separated coils. In this manner a partially collapsed spring weakened with age can be spaced to bias a vehicle body to the proper distance above the ground. Weakened, collapsed springs which tend to misalign and shorten the life of the drive line of a vehicle can thereby be repaired.

It is known to use a tool employing the principles of a first class lever for the purpose of spreading adjacent coils of a coil spring - see, for example the Surletta et al. U.S. Pat. No. 3,393,895. Such a tool employs two pivotally connected legs or lever arms and force is applied to adjacent coils by each lever arm to spread the coils. One of the problems encountered with the use of such a tool is the difficulty of initially inserting the lever arms between adjacent coils. The problem of initial insertion of the lever arms between adjacent coils of a spring is especially burdensome when the coils are closely spaced as when considerable weight rests upon the spring. Prior efforts to overcome this insertion problem, both in spreader and compressor tools, have been directed toward developing specially shaped lever arm ends shaped to act as wedges for initial separation of adjacent coils and therefore insertion of the tool. See for example the following U.S. Pat. Nos.: Maples - 1,483,821; Madeira - 1,978,543; Berkman - 2,316,646; and Strnisha - 2,897,701.

These prior art tools are inadequate for separation of tightly compressed coil springs, as with coil springs supporting an automotive vehicle, especially when the springs are weakened and collapsed with age. This is because the separation of such heavily biased coil springs requires lever arms having the conflicting properties of strength and taper at the inserted ends.

The device of the present invention has thick, sturdy lever arm ends and can easily be inserted between adjacent coils of a coil spring. This is accomplished by providing elongated lever arms or legs which are pivotable in three directions to provide freedom of movement of each leg in any direction near the coil-contacting end of each leg. A removable fulcrum is also provided and positioned after the tool is inserted between adjacent coils.

Accordingly, it is an object of the present invention to provide a new and improved device for spreading biased members.

Another object of the present invention is to provide a new and improved apparatus for spreading adjacent coils of a coil spring.

Another object of the present invention is to provide a new and improved tool capable of easy insertion between tightly compressed, closely spaced coils of a coil spring.

Another object of the present invention is to provide a new and improved device having two lever arms capable of being inserted between adjacent coils, one at a time, for spreading adjacent coils of a coil spring.

Another object of the present invention is to provide a new and improved device for separating adjacent coils of a coil spring which device employs the principals of a lever and has a fulcrum capable of separation from at least one of the lever arms.

Another object of the present invention is to provide a new and improved device having two elongated lever arms pivotable in at least two directions for easy and individual insertion between coils, for separation of adjacent coils of a coil spring.

Another object of the present invention is to provide a new and improved device having force arms equal in length to almost the entire length of the lever arms.

Another object of the present invention is to provide a new and improved tool having lever arms separable from, and movable completely independent from a fulcrum.

Another object of the present invention is to provide a new and improved tool having means for applying force to coils of a coil spring, the means being disposed at the non spring-contacting end of the tool, for separation of adjacent biased members.

Another object of the present invention is to provide a new and improved separation tool having lever arms adapted to be individually forced between adjacent coils of a coil spring by applying force to each lever arm at a rounded non spring-contacting end thereof.

Another object of the present invention is to provide a tool capable of self alignment once inserted between adjacent coils of a coil spring so that force is equally distributed to each of two lever arms during separation of the coils.

Another object of the present invention is to provide a new and improved device for separating adjacent coils of a coil spring wherein very little or no shear force is applied to the structural components of the device during separation of coils.

Another object of the present invention is to provide a new and improved device having rounded pivot pins which self align during separation of coils of a coil spring to minimize the shear forces on said device during use.

Another object of the present invention is to provide a new and improved device employing two lever arms constructed and pivotally connected in a manner so that the work load is evenly distributed to each lever arm during use.

Another object of the present invention is to provide a new, improved and safer tool for separating adjacent coils of a coil spring constructed so that the work load never suddenly shifts from one lever arm to the other, thereby avoiding unsafe, sudden and destructive stresses and strains on any component of the tool.

In brief, the above and other objects and advantages of the present invention are achieved by the provision of a new and improved tool having lever arms pivotable in at least two directions. Numerous other objects and advantages of the present invention will become apparent in the following detailed description of the invention with reference to the accompanying drawing in which:

FIG. 1 is a perspective view of a device constructed in accordance with the principals of the present invention;

FIG. 2 is a partially elevational and partially cross sectional side view of the device of FIG. 1 showing the device in broken lines during insertion between adjacent coils of a coil spring;

FIG. 3 is a partially elevational and partially cross-sectional fragmentary side view of the device of FIG. 1 after separation of adjacent coils of a coil spring.

FIG. 4 is a partially elevational and partially cross-sectional fragmentary side view taken along lines 4—4 of FIG. 3, showing a spacing member inserted between separated adjacent coils of a coil spring.

FIG. 5 is a partially elevational and partially cross-sectional fragmentary side view of a portion of the device of FIG. 1, taken along the lines 5—5 of FIG. 3;

FIG. 6 is a perspective view of the device of FIG. 1 showing two of the three degrees of freedom of each leg member, each leg member being pivoted for angular insertion between adjacent coils so that each coil can be approached from the side thereof;

FIG. 7 is a fragmentary side view of a portion of the device of FIG. 1 during separation of adjacent coils of a coil spring.

Similar reference characters refer to similar parts throughout the several views of the drawing.

Referring now to the drawing, and particularly to FIG. 1, the new and improved coil spring spreader of the present invention is generally referred to by reference numeral 10. The device generally includes two elongated leg members 12 and 14 each having a pivot pin 16 and 18. Each leg member 12 and 14 is interconnected between pivot pins 16 and 18 by an axis of interconnection 20. Removable fulcrum means 22 and 23 are provided for insertion between the leg members 12 and 14 after the leg members have been inserted in position.

An important feature of the present invention is that each leg member 12 and 14 is fabricated of a suitably inexpensive yet strong material such as cast steel, tempered steel or laminated steel members and is wedge-shaped at a coil contacting end for insertion between adjacent coils 24 and 26 (FIG. 2) of a coil spring 28. An important feature of the present invention, as best seen in FIG. 2, is that each leg member 12 and 14 can be separately pivoted to be inserted or removed from between coils 24 and 26 by sliding each leg member from side to side (angularly). This angular rotation is possible since fulcrum means 23 is removable. Near the coil contacting end of each elongated leg member 12 and 14 elongated annular recesses 30 and 32 are provided for engaging the adjacent coils 24 and 26 of coil spring 28. Each leg member 12 and 14 can be identically shaped for easy and economical fabrication. Near the pivotal end, leg member 12 has an enlarged tapered slot 34 and leg member 14 has an enlarged tapered slot 36, each adapted to receive the axis of intersection 20.

An important feature of the present invention is in the provision of a removable fulcrum means 22 or 23. Leg member 12 is provided with a fulcrum means receiving recess 38 and leg member 14 is provided with a complementary fulcrum means receiving recess 40. Recesses 38 and 40 can advantageously be formed having the same radius of curvature as the smaller removable fulcrum 23 (FIG. 3). The curvature of recesses 38 and 40 can be widened at its edges to provide platforms 38A and 40A having the same curvature as a larger fulcrum 22 (FIG. 7). After both leg members 12 and 14 are positioned between adjacent coils 24 and 26 of a coil spring 28, the fulcrum member 22 or 23 is inserted into the fulcrum means receiving recesses 38 and 40. In this manner, each leg member 12 and 14 can be individually inserted between adjacent coils 24 and 26. Each leg member has three degrees of pivotal freedom for easy and individual insertion between coils 24 and 26. After insertion of each leg member 12 and 14, the fulcrum member 22 or 23 is positioned between leg members 12 and 14.

An important feature of the present invention is the provision of a removable fulcrum means. In this manner, fulcrum members of various sizes (22 and 23 of FIG. 1) can be provided to provide for varying degrees of mechanical advantage and varying amounts of spread between coil members 24 and 26 while otherwise maintaining the same size and construction of tool parts.

An important advantage in providing a removable fulcrum means is in allowing each leg member 12 and 14 absolute freedom at its insertion end for movement in any direction for easy and individual insertion between coils 24 and 26. By providing pivot means 16 and 18 for pivoting each leg member near its non coil-contacting end, each leg member is allowed three degrees of freedom for easy insertion between heavily biased and closely spaced adjacent coils 24 and 26 of coil spring 28.

Pivot pin 16 is inserted into a bore made near the pivotal end of the elongated leg member 12 and except for its engagement with the axis of interconnection 20, it would be absolutely free to rotate or pivot within said bore. The pivot pin 16 can thereby rotate during use to lessen or eliminate shear forces on pin 16. Pivot pin 16 is provided with a threaded aperture 42 for threadely receiving axis of interconnection 20. Because of the pivotal nature of pivot pin 16 and because of the degree of freedom provided by the enlargement of tapered slot 34 (FIG. 3), leg member 12 is provided with limited pivotal freedom in a direction defined by a plane passing through the longitudinal axis of the axis of interconnection 20. Further, since the axis of interconnection 20 threadedly engages pivot pin 16, the elongated leg member 12 is free to pivot through said threads around said axis of interconnection 20 in a direction substantially perpendicular to the longitudinal axis of the axis of interconnection 20.

Pivot pin 18 is inserted into a bore made near the pivotal end of elongated leg member 14 and except for its contact with axis of interconnection 20, pivot pin 18 would be free to rotate within said bore. Pivot pin 18 can thereby rotate during use to lessen or eliminate shear forces on pin 18. Pivot pin 18 is provided with an elongated aperature 44 made wider than the diameter of the axis of interconnection 20 and adapted to receive axis of interconnection 20. Elongated aperture 44 is made wider than the diameter of interconnection axis 20, so that elongated leg member 14 is free to slide along the longitudinal axis of the axis of interconnection 20 before insertion of leg member 14.

Because of the pivotal nature of pivot pin 18 and because of the limited degrees of freedom provided by enlarged, tapered slot 36, the elongated leg member 14 is provided with a limited degree of pivotal freedom in a direction defined by a plane passing through a longitudinal axis of the axis of interconnection 20. Elongated aperture 44 is made wider than the diameter of axis of interconnection 20, thereby permitting elongated leg member 14 absolute freedom to pivot in a direction defined by a plane substantially perpendicular to the longitudinal axis of the axis of interconnection 20.

Elongated leg member 12 has a third degree of limited freedom provided by both the pivot pin 18 and enlarged slot 36. Pivot pin 18 and enlarged slot 36 enable elongated leg member 12 to be pivoted by rotation of pivot pin 18. In like manner, elongated leg member 14 is provided with a third degree of limited freedom provided by pivot pin 16 and enlarged slot 34. Pivot pin 16 and enlarged slot 34 enable elongated leg member 14 to be pivoted by rotation of pivot pin 16.

The three degrees of pivotal freedom enable easy and individual insertion of each leg member 12 and 14 between adjacent coils 24 and 26 of coil spring 28 by angular rotation similar to that shown in FIG. 6. It is an important feature of the present invention that the coil-contacting end of each leg member can be moved individually in any desired direction. After insertion, the desired fulcrum means 22 or 23 is inserted into position. As best shown in FIG. 5, interconnection axis 20 is provided with hardened thrust washer 46 dimensionally larger than aperture 44. Pivot pin 18 can be machined to provide a flat surface 48 for contact by thrust washer 46 during spreading of adjacent coils 24 and 26. By rotating axis of interconnection 20, leg member 12 and 14 are forced together near their pivotal ends between the threaded connection at pivot pin 16 and thrust washer 46. The threaded axis of interconnection 20 compresses the pivotal ends of leg members 12 and 14 to separate the coil-contacting ends of the legs and thereby spread coils 24 and 26 (FIG. 3). After the coils are spread, a spacing means 50 can be inserted between the coils to raise the vehicle body, or to provide firmer suspension to a vehicle. The three degrees of freedom enable these wedged shaped ends to be fabricated of substantial thickness, yet the individual insertion of the wedged shaped ends of elongated leg members 12 and 14.

FIG. 6 shows the pivotal movement of leg members 12 and 14 as they are pivotal for insertion in a spring. As shown in FIG. 6, each leg member can be inserted between adjacent coils of a coil spring by angularly rotating each leg member 12 and 14, one at a time, by sliding the slots 30 and 32 over the coils 24 and 26 longitudinally from the side thereof.

I claim:

1. Apparatus for applying force to a biased member comprising
    a first elongated leg member having a biased member engaging end and a pivot end;
    a second elongated leg member having a biased member engaging end and a pivot end and interconnected to said first elongated leg member;
    means for interconnecting said first elongated leg member to said second elongated leg member including means defining a slot in each of said leg members, a pivot means in each of said slots and actuating means interconnecting said pivot means, said leg members being independently pivotable about said interconnecting means;
    a fulcrum means disposed in operative condition between said actuating means and said biased member engaging ends of said leg members and separable from at least one of said leg members.

2. Apparatus as defined in claim 1 further including a second means for pivoting said leg members, said second pivot means including means for being disposed to interconnect said second leg member to said interconnection means.

3. Apparatus as defined in claim 2 wherein the first elongated leg member is pivotable about the pivot means in the second elongated leg member.

4. Apparatus as defined in claim 2 wherein the second elongated leg member is pivotable about the pivot means in the first elongated leg member.

5. Apparatus as defined in claim 3 wherein the first elongated leg member is pivotable about a plane substantially perpendicular to the longitudinal axis of the interconnection means.

6. Apparatus as defined in claim 4 wherein the second elongated leg member is pivotable about a plane substantially perpendicular to the longitudinal axis of the interconnection means.

7. Apparatus as defined in claim 5 wherein the first elongated leg member is pivotable about a plane substantially passing through the longitudinal axis of the interconnection means.

8. Apparatus as defined in claim 6 wherein the second elongated leg member is pivotable about a plane substantially passing through the longitudinal axis of the interconnection means.

9. Apparatus as defined in claim 2 wherein one of said pivot means is pviotally secured to the interconnection means and the other of said pivot means is free to slide along the longitudinal axis of said interconnection means.

10. Apparatus as defined in claim 9 further including a stop means disposed near one end of said interconnection means for limiting the longitudinal sliding movement of said other pivot means.

11. Apparatus as defined in claim 9 wherein said secured pivot means is threadedly secured to said interconnection means.

12. Apparatus as defined in claim 11 wherein said secured pivot means is threadedly removable from said interconnection means.

13. Apparatus as defined in claim 2 wherein each of said pivot means is removable from said leg members.

14. Apparatus as defined in claim 2 wherein each pivot means comprises a pivot pin having an interconnection means receiving aperture therein.

15. Apparatus as defined in claim 14 wherein each leg member includes means for receiving said pivot pin.

16. Apparatus as defined by claim 1 wherein the slots are enlarged for permitting limited pivotal movement of said interconnection means within each slot.

17. Apparatus as defined by claim 16 wherein the slots are enlarged such that the interconnection means is pivotal through an angle of at least 20° in each slot.

18. A method of separating two biased members comprising:
    inserting a first leg member between said biased members to engage a first biased member;
    individually inserting a second leg member between said biased members to engage a second biased member by pivoting said second leg member relative to said first leg member in a direction toward said second biased member until said second leg member is inserted between said biased members;
    inserting a fulcrum means between said leg members;
    applying force to said leg members at a point between said fulcrum means and the ends of the leg members not in contact with the biased members to cause said leg members to converge at said ends and to cause the inserted ends of said leg members to diverge and thereby make forceful contact with said biased members to separate said biased members;
    maintaining each leg member in contact with one of said biased members while said biased members are separating.

19. A method as defined in claim 18 wherein each leg member is interconnected with a means for interconnecting said leg members, and wherein said second leg member is pivoted in three directions during insertion between said biased members by pivoting said second leg member (1) through a plane passing through the longitudinal axis of the interconnecting means; (2) through a plane substantially perpendicular to the longitudinal axis of the interconnection means, and (3) about a point of contact made between the interconnection means and said first leg member.

* * * * *